United States Patent [19]

Taylor et al.

[11] Patent Number: 5,539,851
[45] Date of Patent: Jul. 23, 1996

[54] HYBRID OPTICAL FIBER/COPPER COAXIAL DATA TRANSMISSION CABLE

[76] Inventors: John A. Taylor, 702 E. Vista Way, Vista, Calif. 92084; Robert C. Bartlett, 385 Ridge Ave., Winnetka, Ill. 60093

[21] Appl. No.: 422,804

[22] Filed: Apr. 17, 1995

[51] Int. Cl.⁶ ........................................... G02B 6/44
[52] U.S. Cl. .................... 385/101; 385/107; 385/102
[58] Field of Search ........................... 174/102 R, 103, 174/105 R, 107, 113 R, 36; 385/100–113

[56] References Cited

U.S. PATENT DOCUMENTS

| | | | |
|---|---|---|---|
| 4,304,462 | 12/1981 | Baba et al. ........................... | 385/107 |
| 4,979,795 | 12/1990 | Mascarenhas ........................ | 385/107 |
| 5,237,917 | 5/1993 | Traut et al. ........................... | 101/35 |
| 5,371,825 | 12/1994 | Traut ..................................... | 385/101 |
| 5,418,878 | 5/1995 | Sass et al. ............................. | 385/101 |

*Primary Examiner*—John Ngo
*Attorney, Agent, or Firm*—Ross, Ross & Flavin

[57] ABSTRACT

A hybrid cable is implemented by a concentric arrangement of a central optical fiber encased by a sleeve of Kevlar and an outer jacket of FEP(Teflon) insulation and surrounded by an annular (hollow) electrical conductor consisting of two rows of 16 insulated strands each of 33 AWG. A second conductor made of braided copper strands concentrically surrounds the first conductor but is separated therefrom by a layer of FEP insulation. Another layer of insulation surrounds the second conductor.

4 Claims, 1 Drawing Sheet

HYBRID OPTICAL FIBER/COPPER COAXIAL DATA TRANSMISSION CABLE

BACKGROUND OF THE INVENTION

1. Field of the Invention

This invention relates to a new and novel type of data transmission cable for, but not necessarily limited to, the combined transmission of complex, high speed digital data signals (including asynchronous transfer mode), digital video signals, true interactive video, video telephony (including video conferencing) and high frequency analog signals (upper range 750 MHz to 1 GHz)—all in one common cable.

It allows the transmission of complex data transmission signals and uncompressed video signals, in both analog and digital form, as well as video telephones over a 1 GigaHertz range allowing a systems designer to use within a single cable, different frequency ranges for different assignments.

2. Description of the Prior Art

No anticipatory art has been developed.

SUMMARY OF THE INVENTION

The cable is composed of a concentric arrangement of a central optical fiber encased in a composite jacket consisting of a Kevlar sleeve circumscribing the optical fiber and a layer of FEP (fluoropolymer) insulation circumscribing the Kevlar sleeve.

The enclosing of this sheath system serves to protect and reinforce the optical fiber unit.

The FEP jacket (outboard of the Kevlar sleeve) is surrounded by a first set of insulated strands, 32 in number, there being 16 in each of two strand rows.

A second layer of FEP insulation circumscribes the first set and a second set of braided copper strands concentrically surrounds the second FEP layer.

An outermost third jacket of FEP insulation surrounds the second set of copper braided strands.

BRIEF DESCRIPTION OF THE DRAWING

The following detailed description of the invention will become more readily understood when considered in conjunction with the accompanying drawings in which.

DESCRIPTION OF THE PREFERRED EMBODIMENT

Figure 1:
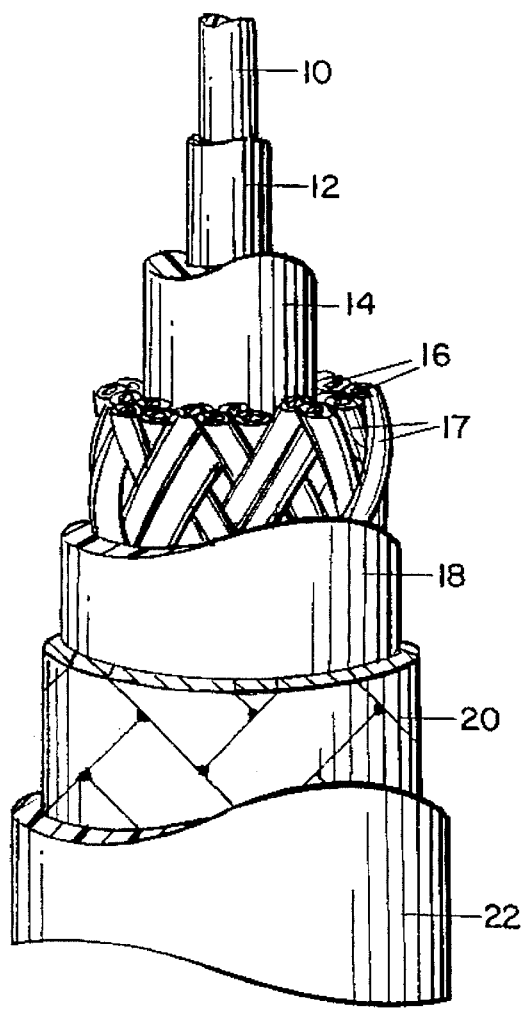
FIG. 1 is a side elevational view of a fragment of a cable in accordance with the preferred embodiment of the invention, components have been cut away to aid in an understanding thereof.
Figure 2:
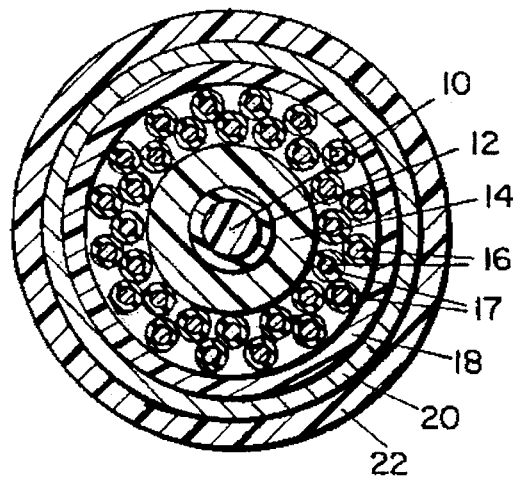
FIG. 2 is a transverse cross sectional view of the cable shown in FIG. 1.

The invention was developed primarily for use in connection with the transmission of complex data transmission signals. However, its application is not limited thereto and may, when desired, be extended to other-types of service, especially where capacity is a factor.

The electrical and optical data transmission capabilities of the cable directly affect its size and functionality.

This hybrid optical fiber/copper coaxial data transmission cable allows information superhighway network architects i.e. systems designers, to have one communications link between the "curb" and the subscriber (referred to as the "drop cable") and even, for "feeder cables" (upstream from the "curb").

Further, the hybrid cable permits the option to start out with an advanced, annular (hollow) electrical center conductor coaxial cable and later to switch to an optical fiber or, to divide up (between the optical fiber and copper based, annular coaxial cable), digital and analog transmissions as systems requirements may dictate, including but not limited to upgrades in sending and receiving equipment, availability and "volume driven" costs of digital intelligent sets and future need to move from 100 Mbps (Mega bits per second) transmission rates to 155 Mbps transmission rates.

The installation costs of laying a broadband cable for the information superhighway between the "node" (a 500 home capacity substation) and the subscriber, are considerable. Our hybrid design can serve as a "one time" installation allowing for any possible future systems update requirements.

Unlike previous attempts at providing for a hybrid optical fiber/copper cable for the information superhighway, the 62.5 μm optical fiber is at the very center of our insulated annular (or hollow) electrical coaxial conductor as opposed to the industry approach of having the optical fiber "piggy back" a twisted pair of normal, solid core (or stranded), insulated copper conductors or, a hybrid Plenum cable (used solely for the interior of a building) wherein an optical fiber is surrounded by multiple, twisted pairs of small gauge, normal metal conductors.

By having the 62.51 μm optical fiber inside of our insulated, annular (or hollow) "send" conductor, the optical fiber is fully protected from any possible damage by the full construction of an annular center electrical conductor, coaxial construction cable (with a sizeable insulated wall between the annular conductor and the braided ground/RFI shield—as well as the outer jacket).

Thus it will be observed that we teach that the center of our cable consists of a 62.5 μm optical fiber 10 for the optical transmission of data. The optical fiber is immediately protected by a Kevlar sleeve 12 and both the optical fiber and Kevlar sleeve are, in turn, protected by a fluoropolymer resin (Teflon) jacket 14.

The composite jacketing is housed inside of an annular (or hollow) hot or "send" coaxial conductor 16.

Alternatively, larger diameter optical fibers might be employed or, more than one optical fiber might be used in the center with the optical fibers being parallelly oriented relative to the cable axis and the same being covered with a Kevlar sleeve and a FEP jacket.

For the electrical transmission of signals, the inner electrical conductor, the primary "send" leg (conductor), is comprised of 32 individually insulated wire strands held tightly against the outer surface of the FEP jacket and woven in two rows of tubular braid, there being 16 strands in an inboard row and 16 strands in an outboard row. The 32 strands are woven in a tubular braid incorporating the two rows of opposed, helically-arranged sets of pairs.

The wire strands are comprised of #33 AWG wire, same offering the best balance of skin effect and signal strength, with each individual strand being preferentially provided with its own electrical insulation 17 covering of polyurethane resin or equivalent.

Each row of braids is so interlaid that each strand of a pair of strands repeatedly passes over a pair of strands of a consecutive set and then under the next pair of strands of the next following set.

By the pairing of the strands in each row, the interlacing allows the passing of one set over the strands of the next consecutive set and then under the strands of the next set, all to the desirable end that the conductor is never more than two insulated wire diameters in thickness at any point or region. Thus a more uniform current density is achieved.

The braiding allows an exceptional tight wrap of the wire strands around the fluoropolymer resin jacket so as to minimize acoustical and mechanical resonances.

The configuration of only two layers of strands offers the further advantage that magnetic strand interaction is minimized.

Lay cancelling is attained so as to help reduce reactance and to provide greater stability and lessen interference effects.

The annular center conductor electrical coaxial design permits scaling up with larger diameter wire strands so that the hybrid cable can also be-used for "feeder cables".

Alternatively, the strands of wire of one lay could be spirally wound, all in one direction, around the fluoropolymer jacket instead of being braided, and the strands of wire of the other lay could be spirally wound in an opposite direction around the same fluoropolymer jacket.

Further alternatively, the said strands could be uninsulated.

A second circumscribing layer of FEP insulation 18, or preferably a foamed fluoropolymer resin dielectric material is formed over the exterior of the braided primary annular "send" conductor. Said layer 18 will be of an appropriate thickness so as to establish the desired characteristic impedance.

A ground leg/RFI shield 20 is comprised of fine stranded copper wires braided around the exterior of the extruded or foamed fluoropolymer layer to complete the coaxial portion of the hybrid cable.

An outermost layer of fluoropolymer insulation 22 circumscribes the fine strand braided ground leg/RFI shield and serves as the outer jacket for the cable.

Alternatively, the fine strand braided ground leg/RFI shield might be wrapped (around the outside diameter of the braid) with aluminum foil to provide 100% shielding against RFI.

Having thus shown and described what is at present considered to be the preferred embodiment of the invention, it is to be noted that the same has been made by way of illustration and not limitation. Accordingly, all modifications, alterations and changes coming within the spirit and scope of the invention are herein meant to be included.

We claim:

1. A hybrid cable consisting of a concentric arrangement of:

a central optical fiber, a first inner sleeve of "Kevlar" circumscribing the central optical fiber, a jacket of fluoropolymer resin circumscribing the "Kevlar" sleeve, a first set of electrical conductors formed of two rows of 16 strands each of #33 AWG wire circumscribing the jacket, a second inner sleeve of fluoropolymer resin circumscribing the first electrical conductor, a second set of electrical conductors formed of braided copper wires circumscribing the second inner sleeve, an outer sleeve of insulation circumscribing the second electrical conductor.

2. A hybrid data transmission cable for the combined transmission in a common cable of digital data signals and digital video signals and video telephone signals and analog signals in the 1 GHz range comprising in a concentric arrangement:

a central optical fiber encased in a first plastic sleeve;

a first set of electrical conductors of a pair of rows of #33 AWG strands, each of said strands being surrounded by an insulation layer;

a second plastic sleeve;

a second set of electrical conductors braided copper strands;

and a third plastic sleeve.

3. A coaxial cable for the transmission of both electrical and optical energy comprising:

a unitary central axial fiber optic conductor means and a "Kevlar" sleeve surrounding the central axial fiber optic conductor means;

a jacket of fluoropolymer resin serving as insulation and protection and disposed in outer circumscribing relation to the "Kevlar" sleeve;

a first set of electrical conductors disposed in annular fashion around the peripheral surface of the fluoropolymer resin jacket for application of a first electrical signal and comprising of two rows of #33 AWG strands each row comprising sixteen #33 AWG strands, each of said strands is surrounding by an insulation layer;

a first dielectric medium surrounding the first set of electrical conductors and defining an outer surface;

a second set of electrical conductors in the form of braided fine copper wires concentrically surrounding the first dielectric medium, and an outermost dielectric medium surrounding the second set of electrical conductors.

4. A coaxial cable for the transmission of both electrical and optical energy comprising:

a unitary central axial fiber optical conductor means and a "Kevlar" sleeve surrounding the central axial fiber optic conductor means;

a jacket of fluoropolymer resin serving as insulation and protection and disposed in outer circumscribing relation to the "Kevlar" sleeve;

a first set of electrical conductors disposed in annular fashion around the peripheral surface of the fluoropolymer resin jacket for application of a first electrical signal;

a first dielectric medium surrounding the first set of electrical conductors and defining an outer surface;

a second set of electrical conductors in the form of braided fine copper wires concentrically surrounding the first dielectric medium, and an outermost dielectric medium surrounding the second set of electrical conductors.

* * * * *